May 26, 1959  P. H. SCHEFFLER, JR., ET AL  2,888,286
TURBINE APPARATUS
Filed June 24, 1957
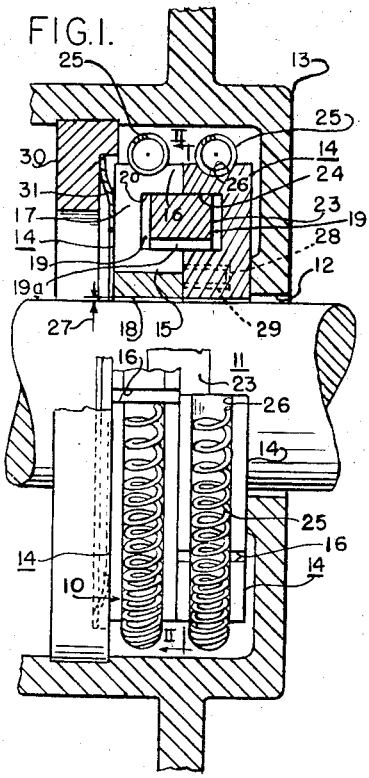
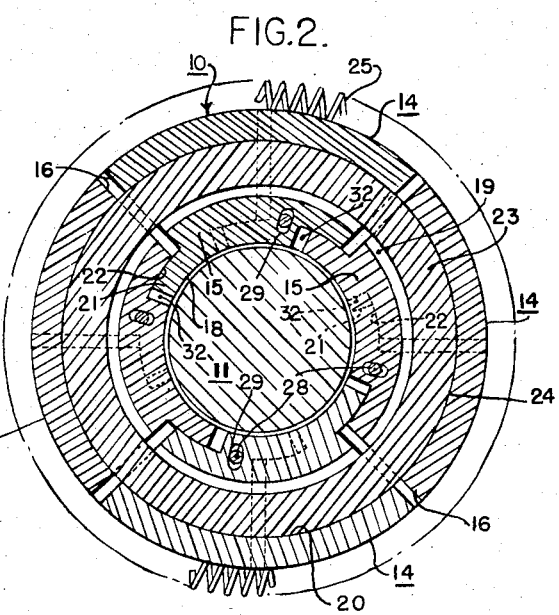
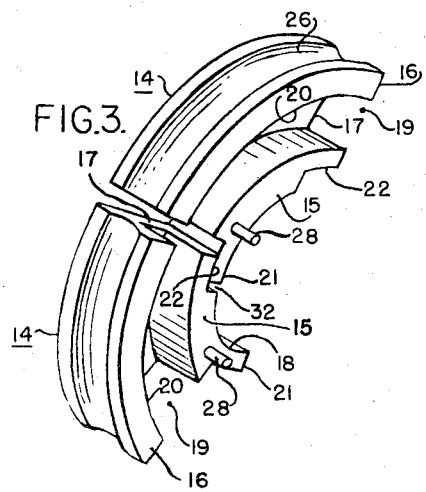
INVENTORS.
PAUL H. SCHEFFLER, JR.
ROBERT R. YOUNG
BY Ralph T. French
ATTORNEY

2,888,286

TURBINE APPARATUS

Paul H. Scheffler, Jr., Kansas City, Mo., and Robert R. Young, Overland Park, Kans., assignors to Westinghouse Electric Corporation, East Pittsburgh, Pa., a corporation of Pennsylvania Application June 24, 1957, Serial No. 667,359

4 Claims. (Cl. 288—13)

This invention relates to a seal structure for minimizing escape of fluid about a movable shaft in the region where the shaft extends through a wall structure, and has for an object to provide a seal structure of the above type which maintains an adequate seal regardless of temperature changes and which is subject to a minimum of wear at its rubbing surface portions.

It is a further object to provide a circumferential seal of the above type for a movable shaft, which seal automatically expands and contracts to the same degree as the shaft when subjected to temperature changes and maintains a predetermined optimum clearance with the shaft.

A more specific object is to provide a seal structure having an annular row of seal members of nonmetallic material, such as carbon, and having means incorporated therein for continuously controlling the radial position of the seal members to maintain a consistent quality of seal with respect to a movable metal shaft.

Another object is to provide a seal structure having an annular row of seal members of material having a relatively low thermal expansion coefficient and having means incorporated therein for controlling the radial position of the seal members about a rotatable shaft having a relatively high thermal expansion coefficient in a manner to provide a uniform seal regardless of variations in temperature.

In accordance with the invention, there is provided an annular seal structure adapted to be supported by a housing or the like in encompassing relation with a rotatable shaft adjacent the region wherein the shaft extends through the housing. The seal structure comprises a pair of juxtaposed annular rows of segmented seal members jointly defining a circular inner seal surface disposed in encompassing relation with the outer surface of the shaft. The seal members are formed of carbon or other suitable seal material usually employed in the art and are formed with arcuate recessed portions jointly defining an annular recess or groove encompassing the shaft. A rigid endless metallic ring is disposed in the recess and a pair of garter springs encompass the rows of seal members to urge the latter radially inwardly against the metallic ring.

The carbon or other material of which the seal elements are formed has a lower thermal coefficient of expansion than the shaft. However, the ring is formed of a metal having a thermal coefficient of expansion which is identical or substantially similar to that of the shaft. Hence, when the temperature of the seal strucure and the shaft rises or falls, the radius of the ring increases or decreases, respectively, at the same rate as that of the shaft. Since the seal members are in biased abutment with the ring, they are moved radially outwardly or inwardly by the ring to maintain their position relative to the surface of the shaft. Preferably, though not essentially, the ring is proportioned to maintain the seal members in slightly spaced relation with the surface of the shaft (on the order of several thousandths of an inch) to reduce rubbing friction and prolong the life of the seal members. Also, the seal members in one row are staggered or circumferentially displaced relative to the seal members in the other row to minimize fluid leakage between the members.

The foregoing and other objects are effected by the invention as will be apparent from the following description and claims taken in connection with the accompanying drawings, forming a part of this application, in which:

Fig. 1 is an axial sectional view showing a seal structure embodying the invention;

Fig. 2 is a transverse section taken on line II—II of Fig. 1; and

Fig. 3 is a perspective view illustrating two of the seal members in operative association with each other.

Referring to the drawing in detail, especially Fig. 1, there is shown a seal structure 10 formed in accordance with the invention and associated with a movable shaft 11 extending therethrough in the region of an opening 12 provided in a housing structure 13.

As well known in the art, the seal structure 10 is utilized to minimize leakage of liquid, gases or the like contained within the housing 13 to the exterior of the housing through the opening 12 during all conditions of operation of the shaft including movement thereof as well as the stationary condition.

The seal structure 10 is provided with a pair of juxtaposed annular rows of segmented seal members 14. The seal members 14 may be substantially identical; hence only one will be described. The seal member 14 is of arcuate shape and is provided with a radially inwardly disposed arcuate wall portion 15, an outer arcuate wall portion 16, and a side wall portion 17 joining the inner and outer portions 15 and 16. The inner portion 15 has an arcuate sealing surface 18 of somewhat the same radius as that of the shaft 11 and is disposed immediately adjacent the outer surface thereof. The seal member 14 is further provided with an arcuate recess or groove 19 of rectangular cross section defined on its outer periphery by the arcuate surface portion 20 of the outer wall 16. One end of the seal member is formed with an elongated arcuate flange 21 while the opposite end of the seal member is provided with a mating recess 22 of similar shape and size. Thus, when the seal members 14 are arranged in annular rows as illustrated in Fig. 2, the flange 21 and the complementary recess 22 of adjoining seal members mate with each other to maintain the seal members in contact with each other, yet allow limited movement relative to each other in radial direction as well as circumferential direction.

The two rows of seal members 14 are disposed in side-by-side abutment with each other as shown in Fig. 1, with their arcuate grooves 19 in registry with each other to jointly provide an annular closed chamber 19a, and ring 23 is received within the chamber 19a. The ring 23 is of ample cross-sectional area, and preferably endless to maintain its circular form and obviate deformation under stress, and is formed of a material having substantially the same thermal expansion coefficient as the shaft, so that the radius of the ring will increase with increasing temperature at the same rate as the radius of the shaft. Conversely, when the temperature of the ring and shaft are reduced, their radii are reduced at an equal rate. The ring 23 has an outer cylindrical surface 24 which is disposed in abutment with the surfaces 20 of the seal members, and the two rows of seal members are maintained in biased abutment therewith by a pair of spring members 25. The spring members 25, for illustration purposes, have been shown as being of the helically wound wire garter type. Also, the outer periphery of each of the members 14 may be provided with an annular recess 26 of substantially semi-circular cross-section to retain the associated spring member 25.

The ring 23 is further proportioned in such a manner that it maintains the seal members 14 in spaced circumferential relation with the surface of the shaft 11, the radial degree of spacing being indicated at 27 and being on the order of several thousandths of an inch.

The two rows of seal members 14 are preferably retained in staggered or circumferentially displaced relation with each other, by any suitable means such as dowels 28 received in mating holes 29 provided in the seal members to minimize leakage of fluid past the seal members by elimination of circumferential alignment of radial joints.

The seal structure 10 is maintained in axial position within the housing 13 by an annular retainer ring 30 and an annular spring 31 disposed in a manner to permit free radial movement of the seal members 14, yet bias the seal structure against the wall of the housing 13 and restrain it against lateral movement parallel to the axis of the shaft 11.

In operation, fluid leakage through the opening in the housing 13 is permitted to a limited degree by the spacing 27 between the surface of the shaft 11 and the seal surface 18 of the seal members 14. Such leakage is entirely permissible in some applications and insures that the seal members 14 will last for a long time, since they are not in full contact with the surface of the shaft. However, if desired, the spacing may be reduced substantially to zero if no leakage through the opening 12 is permitted, it being understood that the rubbing effect may reduce the life of the seal members.

When the value of the ambient temperature surrounding the seal structure 10 and the shaft 11 rises due to operating conditions or for other reasons, the radius of the shaft will increase as determined by its thermal coefficient of expansion. In a similar manner, the radius of the ring 23 will increase at a similar rate, since it is made of the same material as the shaft 11 or of a material having the same thermal coefficient of expansion. As the radius of the ring increases, the circumferential outer surface 24 of the ring will increase and move the seal members 14 jointly in radially outwardly direction an equal amount, thereby maintaining the spacing 27 between the surface of the shaft 11 and the surface 18 of the seal members at a uniform value. Such relative outward movement is permitted by the spring members 25 which yield to the necessary degree. When the value of the ambient temperature surrounding the shaft 11 and the seal structure falls for any reason, the radius of the shaft 11 is reduced at the rate determined by its thermal coefficient of expansion. Concurrently therewith, the radius of the ring 23 is reduced at an equal rate as determined by its thermal coefficient of expansion, thereby permitting the seal members 14 to move radially inwardly under the influence of the springs 25 and maintaining the clearance spacing 27 at the optimum value. For clarity, the circumferential spacing 32 between adjacent seal members 14 has been exaggerated. However, since the seal members in the two rows are circumferentially displaced leakage to the external ambient atmosphere through the spacing 32 is substantially eliminated.

It will now be seen that the invention provides a seal structure for a rotary or otherwise movable shaft in which the desired degree of sealing between the shaft and the seal members is maintained at a constant value regardless of variations in the ambient temperature.

It will further be seen that the invention provides a seal structure which may be expected to have a prolonged life since the degree of rubbing or spacing between the shaft 11 and the seal surfaces 18 is invariable, regardless of variations in the ambient temperature.

With the above arrangement, the selection of the material of which the seal members 14 are made is not limited by thermal conditions or durability since the seal may be arranged to provide a minimum leakage while avoiding or at least minimizing rubbing friction with the shaft. Also, since the expansion characteristics of the seal members need not be considered, the material of which they are made may be selected to fulfill other design requirements.

In the embodiment illustrated, each of the annular rows has four seal members 14. However, the exact number of seal members may be varied as desired.

While the invention has been shown in but one form, it will be obvious to those skilled in the art that it is not so limited, but is susceptible of various changes and modifications without departing from the spirit thereof.

What is claimed is:

1. A seal for sealing a movable shaft and its surrounding housing against passage of fluids, comprising an annular row of segmented seal members encompassing said shaft adjacent said housing, said seal members jointly defining an annular recess encompassing said shaft, an annular member encompassing said shaft and slidably received in said recess, and means for urging said seal members in radial direction against said annular member, said annular member having substantially the same same thermal coefficient of expansion as said shaft and said seal members having a different thermal coefficient of expansion.

2. A seal for sealing a movable shaft and its surrounding housing against passage of fluids, comprising a pair of substantially similar juxtaposed annular rows of segmented seal members encompassing said shaft adjacent said housing, each of said rows of seal members jointly defining an inner seal surface disposed in predetermined juxtaposition with the outer surface of said shaft, said rows of seal members jointly defining an annular recess coaxial with and encompassing said shaft, an endless annular member concentrically received in said recess and supporting said seal members in said predetermined juxtaposition, and means for biasing said seal members in radially inward direction against said annular member, said annular member having substantially the same thermal coefficient of expansion as said shaft and said seal members having a smaller thermal coefficient of expansion than said annular member.

3. A seal for minimizing escape of fluid through an opening in a wall structure having a movable shaft extending therethrough, comprising a pair of juxtaposed annular rows of segmented arcuate seal members encompassing said shaft adjacent said wall structure, each of said rows having an equal number of said seal members jointly defining an inner seal surface, expansible means for retaining said seal surface in predetermined juxtaposition with the outer surface of said shaft, the seal members in one of said rows being circumferentially displaced relative to the seal members in the other of said rows, means for maintaining the seal members in said circumferentially displaced relation, and means for biasing said seal members in an axial direction against said wall structure.

4. A seal for minimizing escape of fluid through an opening in a wall structure having a movable shaft extending therethrough, comprising a pair of juxtaposed annular rows of segmented arcuate seal members encompassing said shaft adjacent said wall structure, each of said rows having an equal number of said seal members jointly defining an inner seal surface disposed in predetermined juxtaposition with the outer surface of said shaft, said rows of seal members jointly defining an annular recess coaxial with and encompassing said shaft, an endless annular member concentrically received in said recess and supporting said seal members in said predetermined juxtaposition, means for biasing said seal members in radially inward direction against said annular member, said annular member having substantially the same thermal coefficient of expansion as said shaft and said seal members having a smaller thermal coefficient of expansion than said annular member, the seal members in one of said rows being circumferentially displaced relative to the seal members in the other of said rows, means for maintaining the seal members in said circumferentially displaced relation, and means for biasing said seal members in an axial direction against said wall structure.

References Cited in the file of this patent
UNITED STATES PATENTS 1,334,393     Parsons  -------------- Mar. 23, 1920